US012807312B2

(12) United States Patent
Meir et al.

(10) Patent No.: US 12,807,312 B2
(45) Date of Patent: Nov. 24, 2026

(54) PAYLOAD RELEASE DEVICE AND ASSEMBLY

(71) Applicant: Flytrex Aviation Ltd., Tel Aviv (IL)

(72) Inventors: Nadav Meir, Tel Aviv (IL); Amit Regev, Tel Aviv (IL); Roman Dvorkin, Givatayim (IL); Aviram Klaiman, Kfar Saba (IL); Alexander Maryanovsky, Rishon Lezion (IL)

(73) Assignee: Flytrex Aviation Ltd., Tel Aviv (IL)

( * ) Notice: Subject to any disclaimer, the term of this patent is extended or adjusted under 35 U.S.C. 154(b) by 1001 days.

(21) Appl. No.: 18/147,339

(22) Filed: Dec. 28, 2022

(65) Prior Publication Data

US 2023/0202657 A1 Jun. 29, 2023

Related U.S. Application Data

(60) Provisional application No. 63/266,121, filed on Dec. 29, 2021.

(51) Int. Cl.
*B64D 1/12* (2006.01)
*B65G 67/02* (2006.01)

(52) U.S. Cl.
CPC ............... *B64D 1/12* (2013.01); *B65G 67/02* (2013.01); *B65G 2814/0398* (2013.01)

(58) Field of Classification Search
CPC .......... B64D 1/12; B64D 1/02; B64D 17/383; B65G 67/02; B65G 2814/0398; B66C 1/38; F16B 45/049; F16B 45/051; F16B 45/053; F16B 45/057
USPC ......... 294/82.24, 82.23, 82.21, 82.35, 82.36, 294/82.26, 82.34
See application file for complete search history.

(56) References Cited

U.S. PATENT DOCUMENTS 2,174,911 A * 10/1939 Stevenson ............... E21B 19/04 294/82.35
3,341,244 A * 9/1967 Johnson .................... B66C 1/38 294/75
4,401,334 A * 8/1983 Kraeling, Jr. ............. B66C 1/34 294/82.36
4,537,434 A * 8/1985 Piercy ....................... B66C 1/38 294/82.31

(Continued)

FOREIGN PATENT DOCUMENTS

AU 2020101457 B4 3/2021
KR 101780454 B1 9/2017

*Primary Examiner* — Christopher Garft
(74) *Attorney, Agent, or Firm* — M&B IP Analysts, LLC

(57) ABSTRACT

A payload release device, a payload release assembly including a payload release device, and methods for arming a payload release device. A payload release device includes a member and a button. The member has a top portion, a bottom portion, and a middle portion. The middle portion has an aperture defining a bottom edge, a first upwardly sloping edge, and a second upwardly sloping edge, wherein each upwardly sloping edge is upwardly sloping with respect to the bottom edge. The button has a top surface and is at least partially disposed in the aperture, wherein the button is depressed toward the first upwardly sloping edge when force is applied thereto, wherein the button raises toward the second upwardly sloping edge when at least a portion of the force applied to the button is released, and wherein the second upwardly sloping edge is parallel with the top surface of the button.

16 Claims, 8 Drawing Sheets

(56) References Cited

U.S. PATENT DOCUMENTS

| | | | | |
|---|---|---|---|---|
| 9,302,770 | B2 | 4/2016 | Burgess et al. | |
| 9,580,173 | B1 | 2/2017 | Burgess et al. | |
| 9,650,136 | B1 | 5/2017 | Haskin et al. | |
| 9,783,295 | B2 | 10/2017 | Takayama et al. | |
| 10,106,257 | B2 | 10/2018 | Patrick et al. | |
| 10,266,266 | B2 | 4/2019 | Sopper et al. | |
| 10,513,354 | B2 | 12/2019 | Sachdev et al. | |
| 10,577,105 | B2 * | 3/2020 | Prager | B64D 1/22 |
| 10,710,722 | B2 | 7/2020 | Burgess et al. | |
| 10,899,448 | B2 | 1/2021 | Shannon et al. | |
| 11,220,338 | B2 | 1/2022 | Prager | |
| 2017/0328391 | A1 | 11/2017 | Matsuda | |
| 2019/0202562 | A1 | 7/2019 | Sopper et al. | |

* cited by examiner

PAYLOAD RELEASE DEVICE AND ASSEMBLY

CROSS-REFERENCE TO RELATED APPLICATIONS

This application claims the benefit of U.S. Provisional Application No. 63/266,121 filed on Dec. 29, 2021, the contents of which are hereby incorporated by reference.

TECHNICAL FIELD

The present disclosure relates generally to payload release devices, and more specifically to devices and assemblies for releasing a payload from an aerial vehicle.

BACKGROUND

As the commercial use of drones for package delivery continues to grow, so does the need for effective ways to deliver payloads using drones. Effective package delivery requires the ability to safely release the package from the drone without damaging the package itself. Consequently, solutions that improve the safety of package release are highly desirable.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term “some embodiments” or “certain embodiments” may be used herein to refer to a single embodiment or multiple embodiments of the disclosure.

Certain embodiments disclosed herein include a method for arming a payload release assembly. The method also includes providing a payload release device including a button and a member having a top portion, a bottom portion, and a middle portion; the middle portion of the member having an aperture, the aperture defining at least a bottom edge, a first upwardly sloping edge, and a second upwardly sloping edge, where each upwardly sloping edge is upwardly sloping at least with respect to the bottom edge; the button having a top surface, where the button is at least partially disposed in the aperture, where the button is depressed when force is applied thereto, where the button raises when at least a portion of the force applied to the button is released, where the second upwardly sloping edge is parallel with the top surface of the button; inserting a top strip of a tag into an aperture defined in the payload release device, where the tag is inserted into the aperture such that the tag is disposed between the top surface of the button and the second upwardly sloping edge; and affixing the tag to a payload such that force is applied to the button.

Certain embodiments disclosed herein also include a payload release assembly. The payload release assembly also includes a housing defining a cavity adapted to accept at least a portion of a payload release device; the payload release device, the payload release device may include a button and a member having a top portion, a bottom portion, and a middle portion; the middle portion of the member having an aperture, the aperture defining at least a bottom edge, a first upwardly sloping edge, and a second upwardly sloping edge, where each upwardly sloping edge is upwardly sloping at least with respect to the bottom edge; and the button having a top surface, where the button is at least partially disposed in the aperture, where the button is depressed when a force is applied thereto, where the button raises when at least a portion of the force applied to the button is released, where the second upwardly sloping edge is parallel with the top surface of the button.

Certain embodiments disclosed herein also include payload release device. The payload release device also includes a member having a top portion, a bottom portion, and a middle portion; the middle portion having an aperture, the aperture defining at least a bottom edge, a first upwardly sloping edge, and a second upwardly sloping edge, where each upwardly sloping edge is upwardly sloping at least with respect to the bottom edge; and a button having a top surface, where the button is at least partially disposed in the aperture, where the button is depressed toward the first upwardly sloping edge when force is applied thereto, where the button raises toward the second upwardly sloping edge when at least a portion of the force applied to the button is released, where the second upwardly sloping edge is parallel with the top surface of the button.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
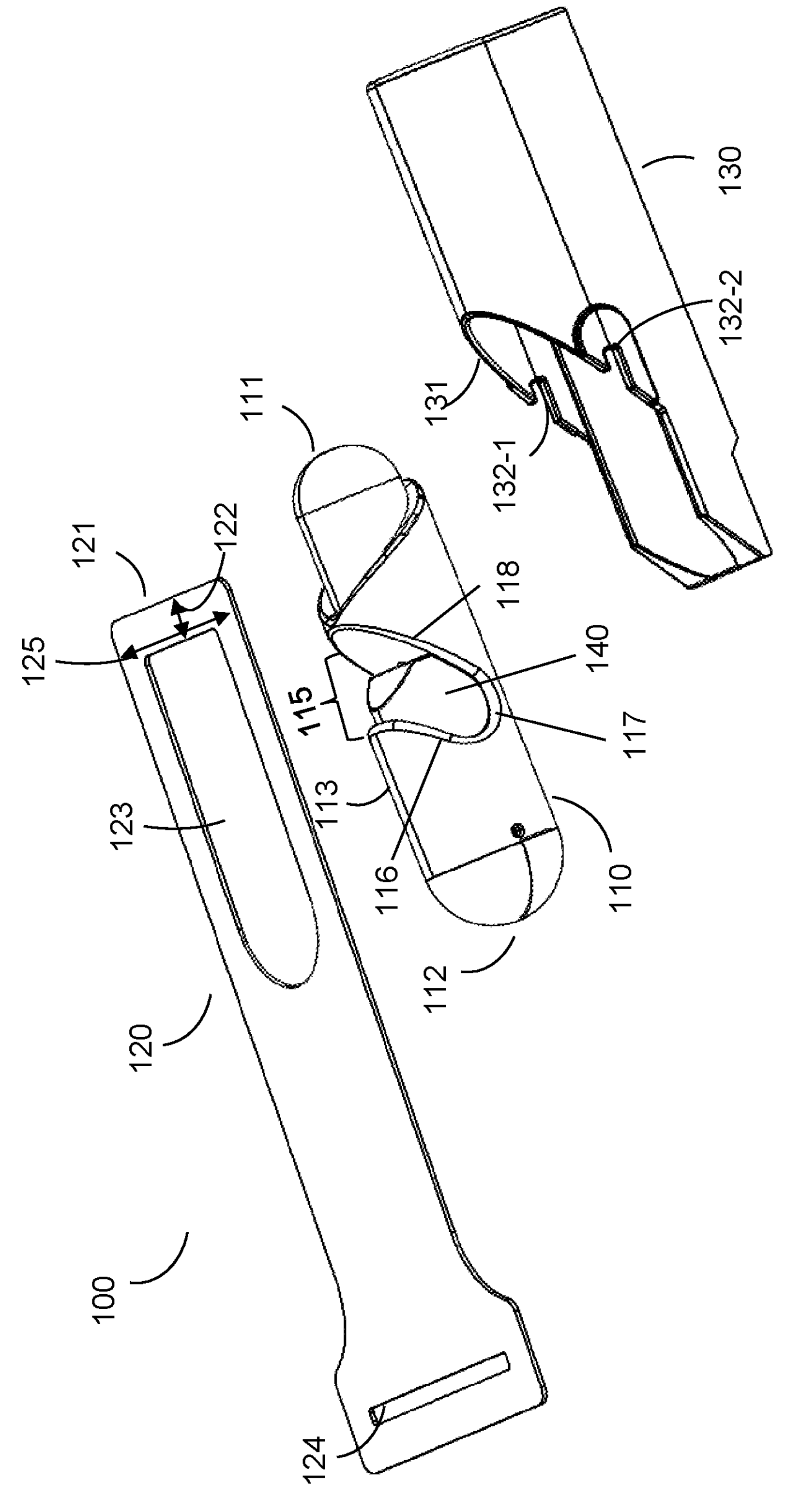
FIG. 1 is an exploded view of a payload release assembly showing a payload release device according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is an exploded view 100 of a payload release assembly showing a payload release device 110 according to an embodiment.

The exploded view 100 illustrates a payload release device 110, a tag 120, and a bottom portion of a housing 130. In some embodiments discussed below, the payload release assembly may further include a tether 150 (not depicted in FIG. 1).

The payload release device 110 depicted in FIG. 1 includes a top portion 111, a bottom portion 112, and a middle portion 113. In an embodiment, a button 140 is disposed in the middle portion 113. The middle portion 113 includes an aperture 115 defined by a first upwardly sloping edge 116, a bottom edge 117, and a second upwardly sloping edge 118. The button 140 is at least partially disposed in the aperture 115 such that a top surface of the button 140 (not provided a numerical reference in FIG. 1) is disposed between the first upwardly sloping edge 116 and the second upwardly sloping edge 118.

In an embodiment, the button 140 includes one or more elastic members (not shown) which allow the button 140 to become depressed as force is applied to the button 140 and allow the button 140 to return to its original state as the applied force is released. In a further embodiment, the elastic members include one or more springs such that the button 140 is spring-loaded.

In an embodiment, the tag 120 includes an aperture 123 (or, in some embodiments, a perforation), and a top strip 121. In some embodiments, the top strip 121 is sized such that it fits into the aperture 115 of the payload release device 110 without needing to be deformed. More specifically, the top strip 121 may have a length 122 such that the length 122 of the top strip 121 is less than the distance between the first upwardly sloping edge 116 and the second upwardly sloping edge 118. Accordingly, a portion of the top strip 121 may be inserted into the aperture 115 and, more specifically, may be disposed between a top surface (not referenced in FIG. 1) of the button 140 and the second upwardly sloping edge 118. This allows for depression of the button 140 as additional force is exerted due to gravity, the attachment of a payload (not shown), or both, to the tag 120 as described further below.

In some embodiments, the tag 120 includes a second aperture 124 at a bottom strip, wherein the bottom strip is diametrically opposed to the top strip 121. In an embodiment, the top strip 121 has a width 125 which is equal to or less than a dimension of the second aperture 124. For example, according to an embodiment, the second aperture 124 has a width which is less than the width 125 of the top strip 121. In some embodiments where the tag 120 includes a flexible material, elastic material, and the like, the top strip 121 is passed through the second aperture 124, thereby resulting in a loop structure formed with the tag 120. In certain embodiments, a loop is formed from the tag 120 such that the aperture 123 passes completely through the second aperture 124. The resulting loop can be used to connect to a payload, for example to a bag handle (e.g., by looping the loop and bag handle together).

In the embodiments depicted in FIGS. 1-5, the housing 130 has a surface 131 with one or more grooves 132. As depicted in these FIGS., the grooves 132 include a first groove 132-1 and a second groove 132-2 (hereby referred to collectively as grooves 132). In an embodiment, the grooves 132 are sized such that the top strip 121 of the tag 120 are inserted into the grooves 132 as depicted and described further below. Specifically, a thickness of the top strip 121 may be less than a thickness of the grooves 132 so that the top strip 121 can fit into the grooves 132. In an embodiment, the surface 131 is parallel or substantially parallel at least to the second upwardly sloping edge 118.

Figure 2:
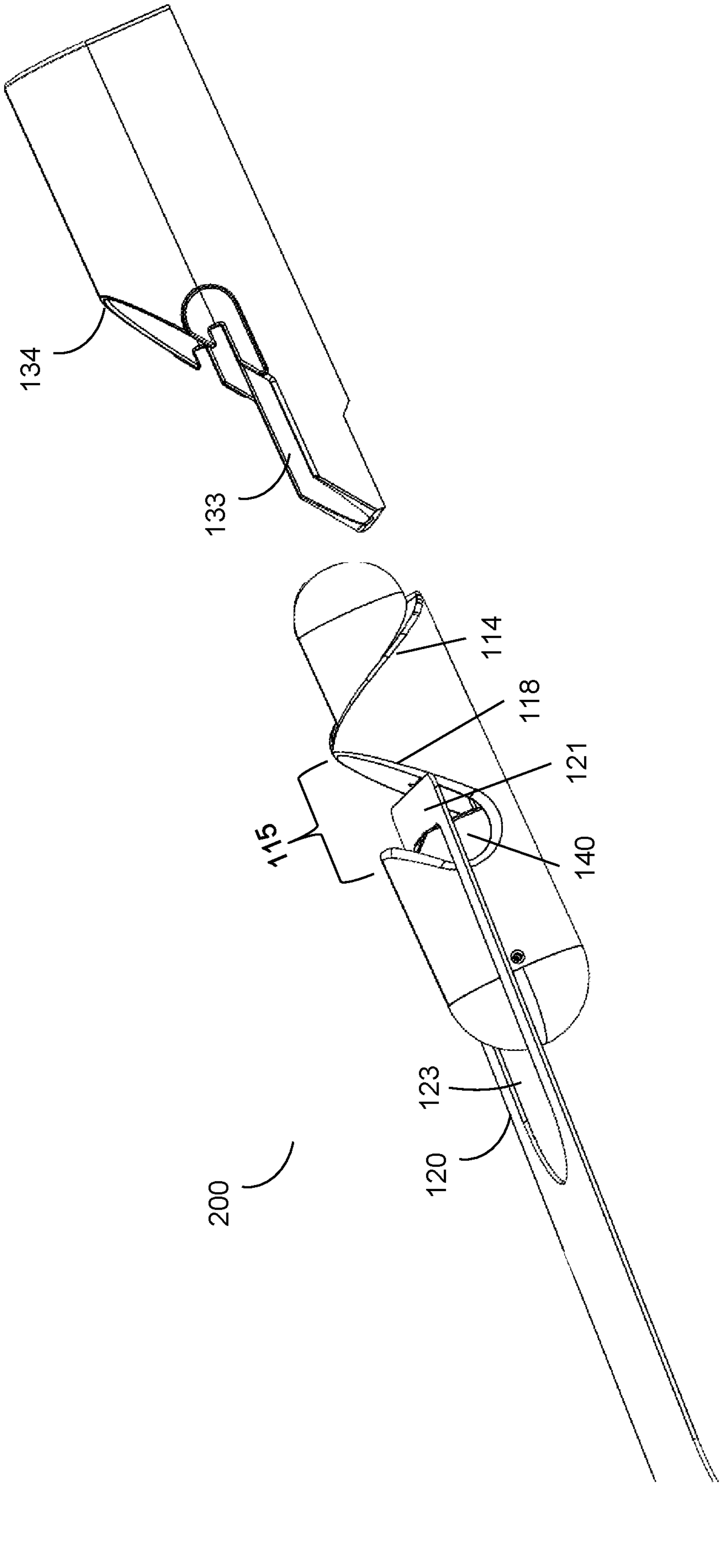
FIG. 2 is a view of a partially assembled payload release assembly according to an embodiment.

FIG. 2 is a view 200 of a partially assembled payload release assembly according to an embodiment.

In the view 200, the top strip 121 of the tag 120 is inserted into the aperture 115. Specifically, as shown in FIG. 2, the top strip 121 is inserted between the button 140 and the second upwardly sloping edge 118. As force is exerted on the tag 120, that force will cause the button 140 to become further depressed. As the tag 120 is inserted into the aperture 115, at least a portion of the payload release device 110 may pass through the aperture 123 of the tag 120.

In an embodiment, the top portion 111 of the payload release device 110 further has a first sloping alignment ring 114. The first sloping alignment ring 114 is designed with respect to a corresponding second sloping alignment ring (not depicted in FIG. 2) disposed in the housing 130 as described further below with respect to FIGS. 6 and 7.

Further, the housing 130 as depicted in FIG. 2 defines a cavity 133 which is adapted to accept the payload release device 110. In particular, the cavity 133 may be sized to allow for insertion of at least a portion of the payload release device 110. The cavity 133 may further have disposed therein the second sloping alignment ring as described further below with respect to FIGS. 6 and 7.

Specifically, the first and second sloping alignment rings are designed such that respective top surfaces of the sloping alignment rings are substantially parallel and come into contact with each other as the payload release device 110 is inserted into the cavity 133 of the housing 130. The contact between the sloping alignment rings therefore causes the top surfaces of the rings to slide past each other via rotation of the payload release device 110 such that the payload release device 110 eventually rests at a particular orientation, regardless of the orientation in which payload release device 110 initially entered the cavity 133.

Figure 7:
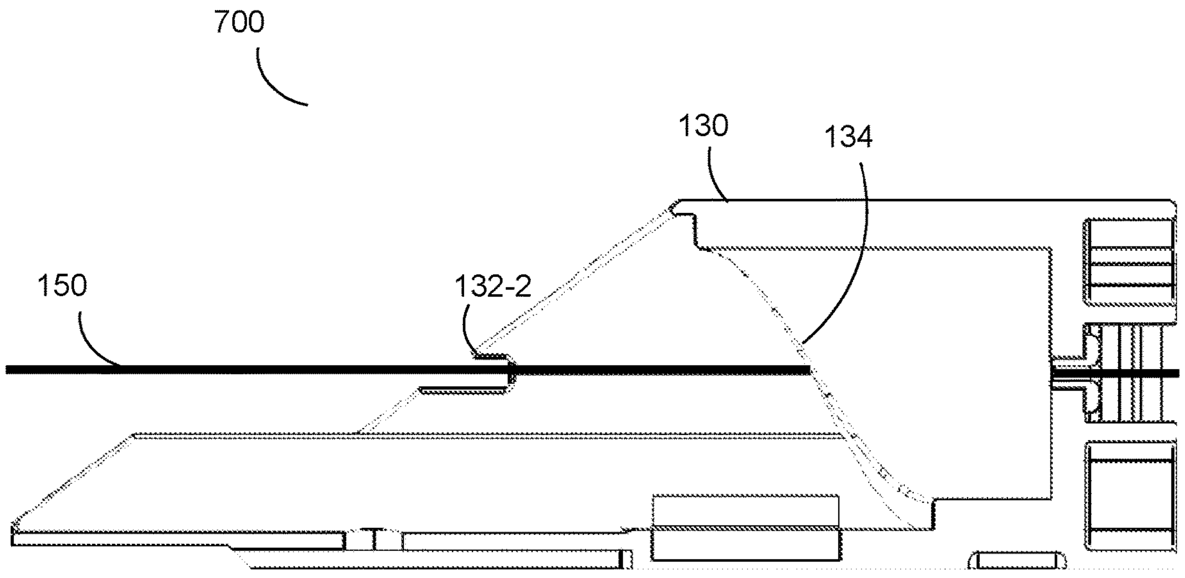
FIG. 7 is a side cross-sectional view of a housing depicting a slope of a sloping alignment ring disposed therein according to an embodiment.

More particularly, in accordance with the embodiments discussed in FIGS. 2 and 7, the payload release device 110 becomes oriented such that the aperture 115 in the payload release device 110 faces upward, i.e., in a direction of a top point 134 of the surface 131 of the housing 130. This orientation ensures that the tag can be readily inserted into and removed from the aperture 115 and that access to the aperture 115 is not blocked by any part of the housing 130.

An advantage of this is that the payload release device 110 is already in an orientation which allows an operator to affix another payload (via an appropriate tag) without having to reorient the payload release device 110, thereby decreasing the amount of time it takes to affix a payload, and therefore increasing a number of payloads deliverable within a timeframe.

Figure 3:
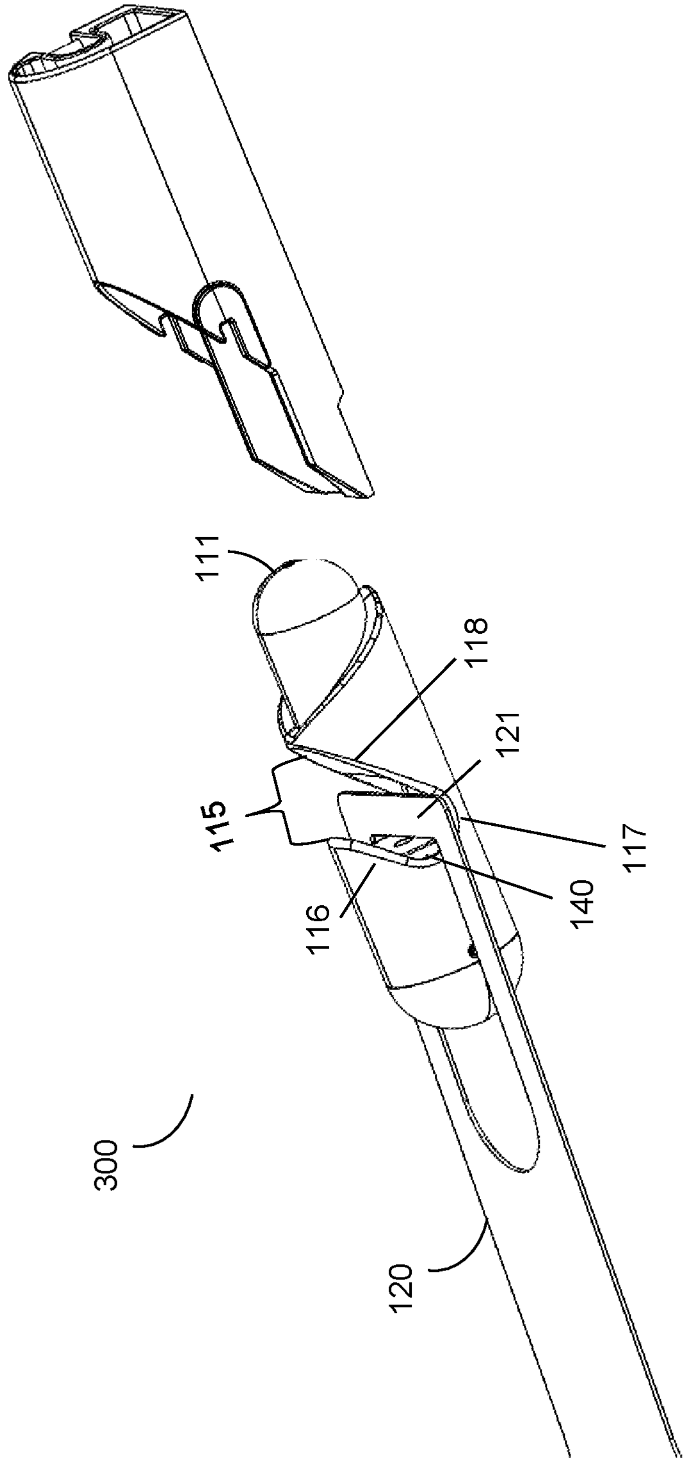
FIG. 3 is a view of a partially assembled payload release assembly according to an embodiment.

FIG. 3 is a view 300 of a partially assembled payload release assembly according to an embodiment.

In the view 300, a force has been applied to the tag 120 (e.g., force due to affixing the tag 120 to a payload, not shown) such that the button 140 is in a depressed position. In an embodiment, as the button 140 is depressed, the top strip 121 of the tag 120 further descends into the aperture 115. Accordingly, in this state, the payload release device is armed. Due to the configuration of the aperture 115 with the first upwardly sloping edge 116 along with the downward force being exerted on the tag 120, the top strip 121 of the tag 120 will remain securely disposed in the aperture 115 when the payload release device is moved, for as long as a downward force sufficient to overcome the force produced by the elastic member is applied.

In an embodiment, when the force applied to the tag 120 which caused the tag 120 to descend is released, the force applied to the button 140 is decreased, thereby allowing the button 140 to raise within the aperture 115, for example due to a release of an elastic member, such as a mechanical spring.

As a non-limiting example, when the payload release device 110 is carried by an unmanned aerial vehicle (UAV) such as a drone, the drone carries the payload (not shown) attached to the tag 120 and, once at its destination, descends the payload such that the payload is placed on the ground. Once the payload is resting on the ground, the force of gravity which causes the tag 120 to be pulled down by the payload is released, thereby releasing the additional force applied to the button 140 (i.e., additional beyond the force of gravity exerted on the button 140 due to the weight of the tag 120 itself). When the force of gravity due to the weight of the tag 120 is less than an upward force exerted by the button 140 (e.g., a restoring force exerted by a spring of the button 140, not shown), the button 140 raises to an initial position (i.e., when no, or little, force is exerted on the button). In an embodiment, this occurs once the additional force caused by the payload is released.

In an embodiment, the button 140 raises such that the tag 120 is ejected from the payload release device 110. Specifically, the button 140 raising causes the top strip 121 of the tag to be pushed out of the aperture 115 by the button 140. Since the button 140 and the top strip 121 are disposed between two upwardly sloping edges 116 and 118, the raising of the button causes the top strip 121 to move both vertically (i.e., upward in the direction of the top portion 111) as well as outwardly (i.e., away from the bottom edge 117 and toward an open area of the aperture 115).

This at least bi-directional movement ultimately causes the top strip 121 of the tag 120 to be ejected from the payload release device 110. More specifically, the elastic members disposed in the button 140 cause the button 140 to return closer to its original state as the force applied to the button 140 is decreased. As the button 140 returns closer to its original state (or, initial state), the button 140 raises and pushes the top strip 121 of the tag 120 upward. Further, due to the angle of the upwardly sloping edge 118, the top strip 121 of the tag 120 is also pushed outward and ultimately ejected from the aperture 115.

Figure 5:
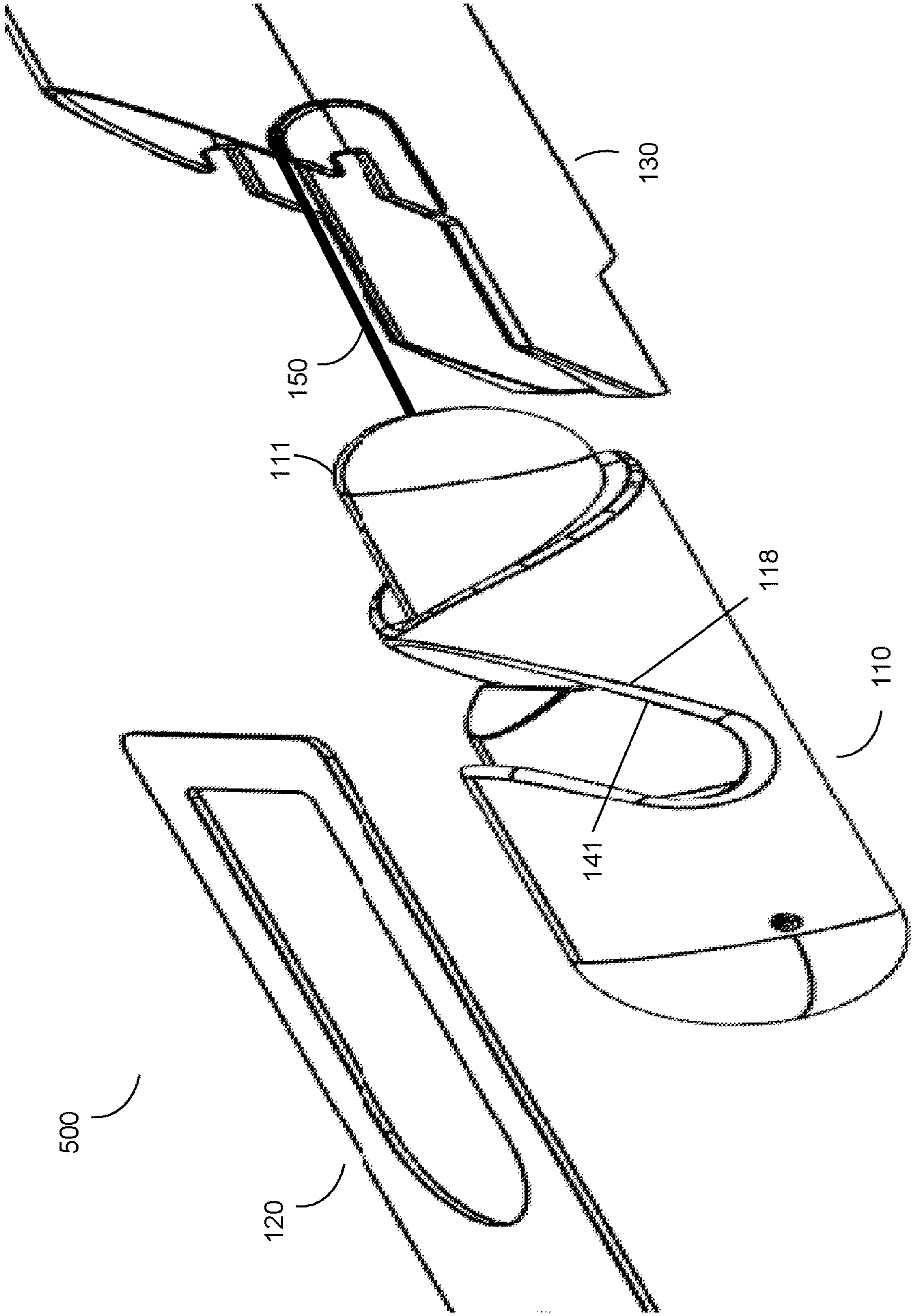
FIG. 5 is a view of a payload release assembly including a payload release device attached to a tether according to an embodiment.

Accordingly, the device depicted and described herein allows for a relatively simple mechanism to release a payload. When a vehicle (not shown) carrying the payload release device 110 attached to the payload via the tag 120 reaches its destination, the payload can be lowered to the ground in order to release most of the force exerted on the tag 120 and the button 140, which in turn allows the tag 120 to be entirely ejected from the payload release device 110. Thus, the vehicle is able to withdraw the payload release device 110 (e.g., via a tether 150 as depicted in FIG. 5) while leaving the tag 120 and the payload behind at the destination. Further, the tag 120 may be made of a relatively inexpensive sturdy material, such as plastic, so as to minimize costs of leaving the tag 120 behind for each delivery.

Figure 4:
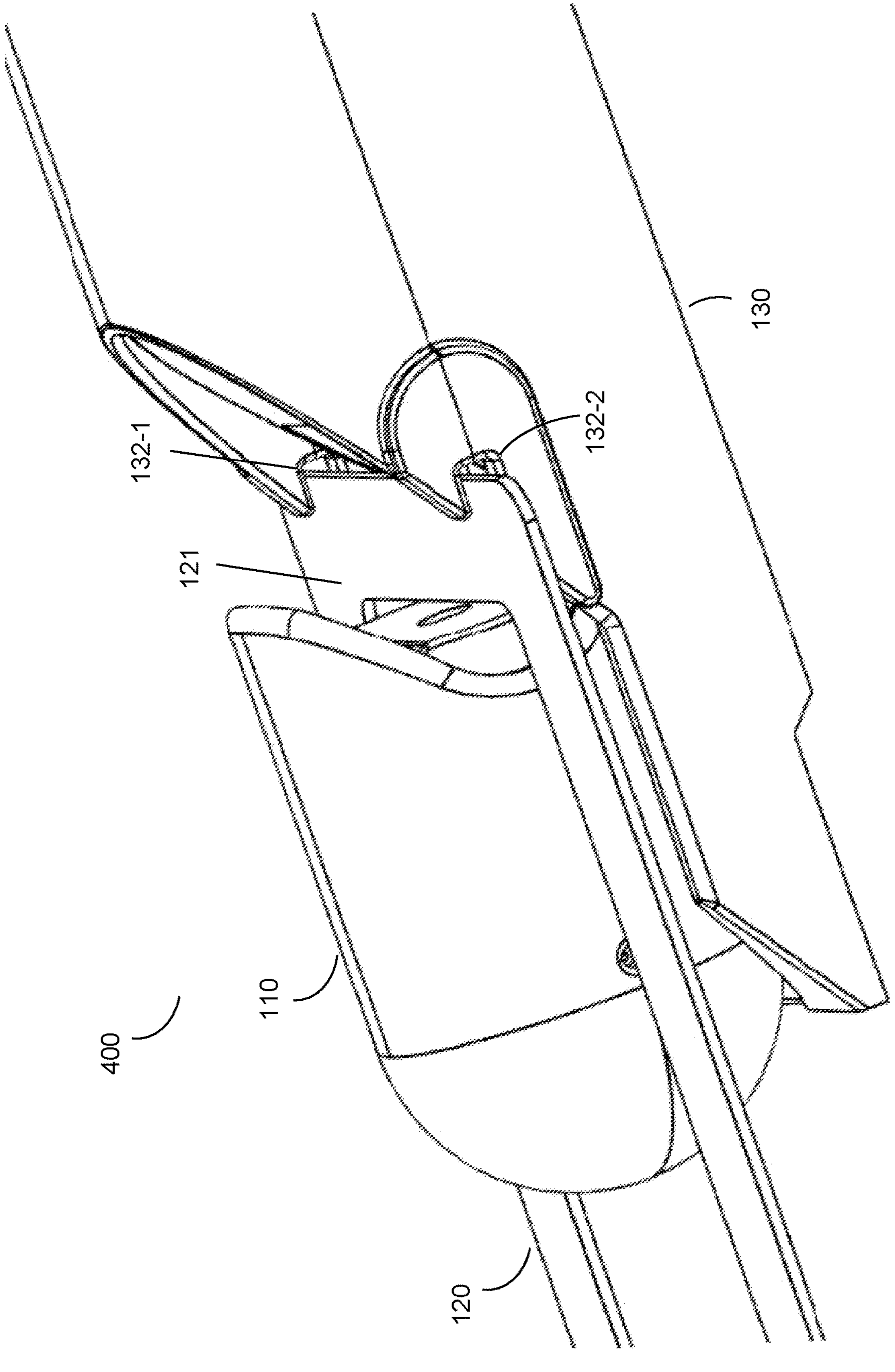
FIG. 4 is a view of a payload release assembly in which a payload release device is armed and the payload release assembly is assembled according to an embodiment.

FIG. 4 is a view 400 of a payload release assembly in which a payload release device 120 is armed and the payload release assembly is assembled according to an embodiment.

In the view 400, in addition to the payload release device 110 being armed with the tag 120 and any corresponding payload (not shown), the payload release device 110 has been partially disposed in the housing 130. Moreover, as the payload release device 110 is inserted into the housing 130, the configuration and position of the grooves 132 of the housing 130 causes the top strip 121 of the tag 120 to be inserted into the grooves 132, thereby securing the top strip 121. In particular, in an embodiment, the movement of the top strip 121, is restricted when the top strip 121 is inserted into the grooves 132, which further ensures that the tag 120 does not accidentally eject from the payload release device 110, for example during flight.

In an embodiment, the payload release device 110 is held in place by applying a force to the bottom portion thereof. In another embodiment, the payload release device 110 is secured in the housing by a tether (e.g., as discussed in more detail in FIG. 5) held under tension.

FIG. 5 is a view 500 of a payload release assembly including a payload release device 120 attached to a tether 150 according to an embodiment.

In an embodiment, the tether 150 is attached to the top portion 111 of the payload release device 110 and is at least partially disposed in the housing 130 such that the payload release device 110 is lowered down from the housing 130 or withdrawn into the housing 130 by lowering or raising the tether 150, respectively (e.g., by raising or lowering the tether 150 via a winch, pulley, or wheel and axle, not shown). Accordingly, in an embodiment, the tether 150 allows the payload release assembly to be securely assembled when the payload release device 110 is armed and attached to a payload (not shown) via the tag 120, and then to lower the payload release device 110 from the housing 130 at a destination.

As noted above, lowering the payload release device 110 allows the payload to be lowered to the ground and the force of gravity caused by the payload to be released, thereby allowing the button 140 to return to its original position and eject the tag 120.

In some embodiments, the tether 150 is a wire, a cord, an elastic cord (e.g., bungee cord), a rope, a combination thereof, and the like.

Also, as shown in FIG. 5, the button 140 has a top surface 141 which is parallel to the second upwardly sloping edge 118. As depicted in FIG. 5, the top surface 141 of the button 140 abuts the second upwardly sloping edge 118.

Figure 6:
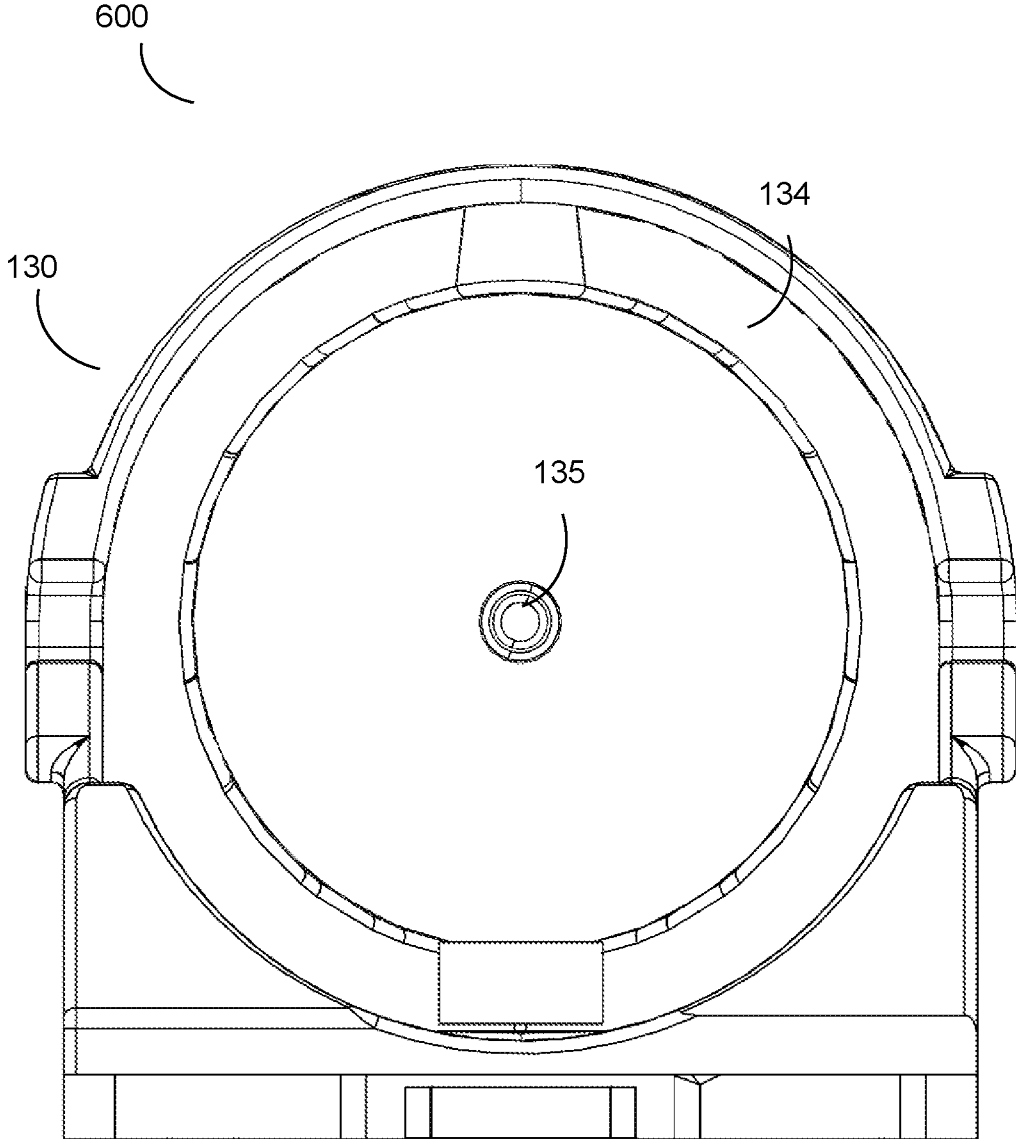
FIG. 6 is a front view of a housing according to an embodiment.

FIG. 6 is a front view 600 of the housing 130 according to an embodiment. As shown in FIG. 6, the housing 130 includes a second sloping alignment ring 134, according to an embodiment. In some embodiments, the second sloping alignment ring 134 is used in conjunction with the first sloping alignment ring 114 of the payload release device 110 in order to orient the payload release device 110 in a specific orientation as discussed above. The housing 130 further includes, in an embodiment, a hole 135 through which a tether (e.g., the tether 150, not depicted in FIG. 6) passes. In an embodiment, the housing 130 includes an aperture, a cylindrical cavity, a hole, a tunnel, and the like, having a cross section sufficiently wide to allow a tether 150 to pass through. In certain embodiments, the cross section is sufficiently wide to allow the tether 150 to pass through and generate little to no friction.

FIG. 7 is a side cross-sectional view 700 of the housing 130 depicting a slope of the sloping alignment ring 134 according to an embodiment. As shown in FIG. 7, the sloping alignment ring 134 is at least partially sloping. In some implementations, the tether 150 may pass through the sloping alignment ring 134 as well as a hole (e.g., the hole 135, not shown in FIG. 7) in the housing 130.

Figure 8:
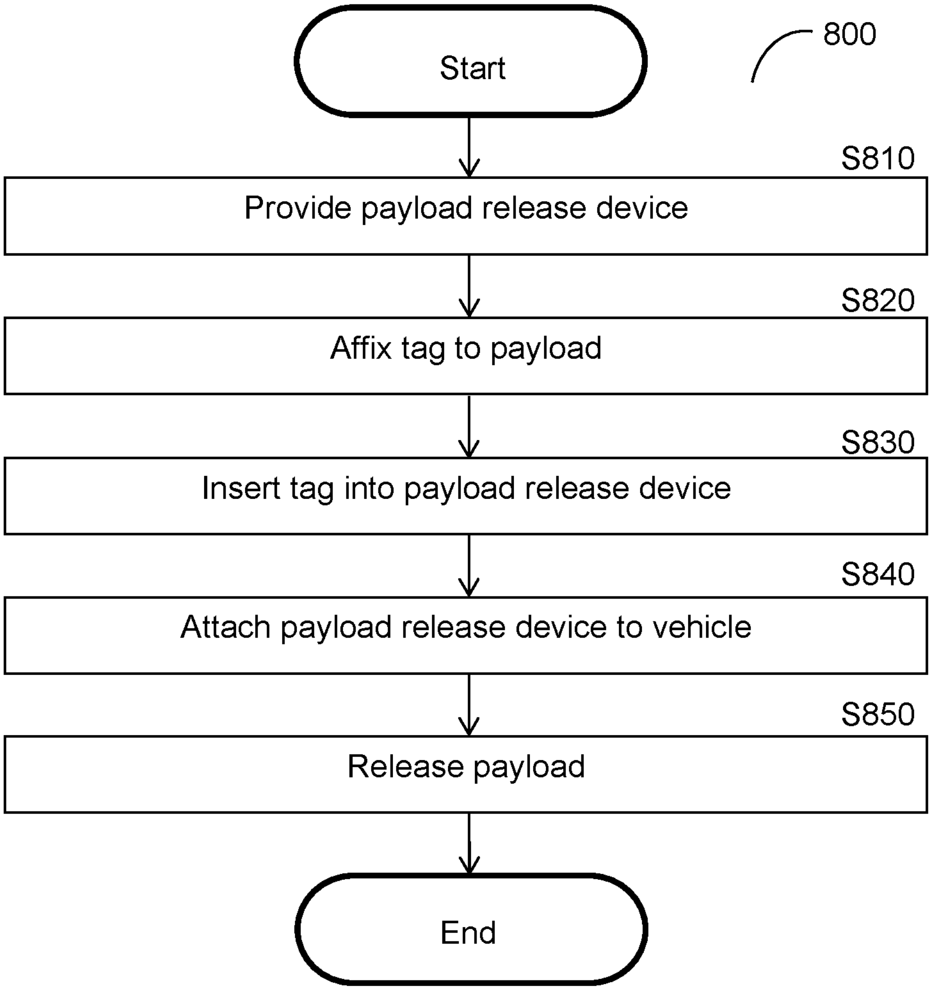
FIG. 8 is a flowchart illustrating a method for arming a payload release device according to an embodiment.

FIG. 8 is a flowchart 800 illustrating a method for arming a payload release device according to an embodiment.

At S810, a payload release device is inserted into a housing. In an embodiment, the payload release device is configured as described above. Specifically, the payload release device has a middle portion with an aperture in which a button is disposed, according to an embodiment. In some embodiments, the button is askew of the middle portion such that, when the button is raised (for example, when the button is spring-loaded and the amount of force being placed on the button is reduced), the button moves toward the top of the aperture and ejects any matter disposed in the aperture (e.g., a tag whose top strip is disposed in the aperture) from the aperture. In some embodiments, including a button which is askew of the payload release device, enables the button to eject matter with at least a bi-directional movement (e.g., in both an X plane and a Y plane) rather than only in a single direction (e.g., only vertical movement within a Y plane).

In an embodiment, the payload release device is held in place by a tether connected through the housing to a tether retractor, such as a winch. In some embodiments, the payload release device includes a magnetic attachment, such as a permanent magnet, or a ferromagnet, having a first pole facing the housing, and the housing includes an electromagnet which is turned on to hold the payload release device, and turned off to release the payload release device. In a further embodiment, the electromagnet has a second pole which is opposite to the first pole of the magnetic attachment of the payload release device.

At S820, a tag is affixed to a payload. In an embodiment, affixing the tag to the payload depresses a button of the payload release device. In certain embodiments, the tag is tied, glued, taped, stapled, attached, or otherwise affixed to the payload. In some embodiments, the tag includes an elastic material having a first aperture and a second aperture, such that the tag is bent on itself to form a loop through the first aperture, where the second aperture is utilized to affix the tag to a payload release device.

At S830, the tag is inserted into the payload release device. In an embodiment, a top strip of the tag (e.g., the top strip 121 of the tag 120) is inserted into an aperture of the payload release device (e.g., the aperture 115 of the payload release device 110). In a further embodiment, the tag is inserted between a top surface of a button disposed in the aperture (e.g., the button 140) and a second upwardly sloping edge of the aperture (e.g., the second upwardly sloping edge 118) such that, when force is exerted on the tag (e.g., the force of gravity caused by a payload attached to the tag), the button is depressed.

At S840, the payload release device is attached to a vehicle. As a non-limiting example, the payload release device is included in, and affixed to, a payload release assembly, such that S840 includes attaching the payload release assembly to an aerial vehicle such as a drone, thereby also attaching the payload release device to the vehicle.

Specifically, in some embodiments, the payload release device is disposed in a housing and attached to a tether that is also attached to the housing or to the aerial vehicle as described above. Further, as noted above, in an embodiment, the housing includes grooves into which the tag is inserted when the payload release device is inserted into the housing.

At S850, the payload is released at a destination. In an embodiment, the payload is delivered to a destination and, at the destination, the payload release device is lowered, thereby releasing the payload. Specifically, for the reasons described above, when the force applied to the tag and, consequently, the button raises, thereby ejecting the tag and separating the payload release device from the payload. Consequently, the aerial vehicle to which the payload release device is affixed is configured to proceed to navigate away from the payload, leaving the payload behind.

In an embodiment, S850 includes lowering a tether (e.g., the tether 150, FIG. 5) attached to the payload release device (e.g., to the top portion 111 of the payload release device 110), until the payload attached to the payload release device via the tag reaches the ground, thereby reducing the amount of force placed on the tag and ultimately causing the tag to be ejected from the payload release device as described above. As a result, the vehicle carrying the payload release device may leave the location at which the payload was dropped to the ground, leaving the payload and the tag behind. In a further embodiment, S850 further includes raising the tether in order to withdraw the payload release device into a housing (e.g., the housing 130).

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as “first,” “second,” and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase “at least one of” followed by a listing of items means that any of the listed items can be utilized individually, or any combination of two or more of the listed items can be utilized. For example, if a system is described as including “at least one of A, B, and C,” the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A payload release assembly, comprising:

a housing defining a cavity adapted to accept at least a portion of a payload release device;

the payload release device, the payload release device further comprising a button and a member having a top portion, a bottom portion, and a middle portion;

the middle portion of the member having an aperture, the aperture defining at least a bottom edge, a first upwardly sloping edge, and a second upwardly sloping edge, wherein each upwardly sloping edge is upwardly sloping at least with respect to the bottom edge, wherein the cavity of the housing further defines a surface that is parallel to the second upwardly sloping edge of the middle portion of the member when the payload release device is at least partially disposed in the housing; and the button having a top surface, wherein the button is at least partially disposed in the aperture, wherein the button is depressed when a force is applied thereto, wherein the button raises when at least a portion of the force applied to the button is released, wherein the second upwardly sloping edge is parallel with the top surface of the button.

2. The payload release assembly of claim 1, wherein the surface defined in the cavity of the housing further comprises at least one groove spaced such that, when a top strip of a tag is disposed in the aperture between the top surface of the button and the second upwardly sloping edge, at least a portion of the top strip of the tag is disposed in the at least one groove.

3. The payload release assembly of claim 1, further comprising:

a tag having a top strip, wherein the top strip of the tag is disposed in the aperture.

4. The payload release assembly of claim 3, wherein the top strip of the tag is disposed between the button and the second upwardly sloping edge of the aperture in the middle portion of the payload release device.

5. The payload release assembly of claim 3, wherein the tag further has a bottom portion, wherein the bottom portion of the tag is affixed to a payload.

6. The payload release assembly of claim 1, wherein the payload release device further comprises a tether attached to the top portion of the member, wherein the tether is at least partially disposed in the housing.

7. The payload release assembly of claim 1, wherein the button is spring-loaded.

8. A method for arming a payload release assembly, comprising:

providing a payload release device including a button and a member having a top portion, a bottom portion, and a middle portion; the middle portion of the member having an aperture, the aperture defining at least a bottom edge, a first upwardly sloping edge, and a second upwardly sloping edge, wherein each upwardly sloping edge is upwardly sloping at least with respect to the bottom edge; the button having a top surface, wherein the button is at least partially disposed in the aperture, wherein the button is depressed when force is applied thereto, wherein the button raises when at least a portion of the force applied to the button is released, wherein the second upwardly sloping edge is parallel with the top surface of the button;

inserting a top strip of a tag into the aperture defined in the payload release device, wherein the tag is inserted into the aperture such that the tag is disposed between the top surface of the button and the second upwardly sloping edge; and affixing the tag to a payload such that force is applied to the button, wherein the payload release device is inserted into a housing defining a cavity adapted to accept at least a portion of the payload release device, and wherein the cavity of the housing further defines a surface that is parallel to the second upwardly sloping edge of the middle portion of the member when the payload release device is at least partially disposed in the housing.

9. The method of claim 8, further comprising:

attaching the payload release device to an aerial vehicle.

10. The method of claim 9, further comprising:

lowering the payload on to a surface such that the force applied to the button is at least partially released, wherein the top strip of the tag is ejected from the aperture when the button raises after the force applied to the button is at least partially released.

11. A payload release device, comprising:

a member having a top portion, a bottom portion, and a middle portion;

the middle portion having an aperture, the aperture defining at least a bottom edge, a first upwardly sloping edge, and a second upwardly sloping edge, wherein each upwardly sloping edge is upwardly sloping at least with respect to the bottom edge; and a button having a top surface, wherein the button is at least partially disposed in the aperture, wherein the button is depressed toward the first upwardly sloping edge when force is applied thereto, wherein the button raises toward the second upwardly sloping edge when at least a portion of the force applied to the button is released, wherein the second upwardly sloping edge is parallel with the top surface of the button, wherein the payload release device is inserted into a housing defining a cavity adapted to accept at least a portion of the payload release device, and wherein the cavity of the housing further defines a surface that is parallel to the second upwardly sloping edge of the middle portion of the member when the payload release device is at least partially disposed in the housing.

12. The payload release device of claim 11, further comprising:

a tag having a top strip at least partially disposed in the aperture between the top surface of the button and the second upwardly sloping edge, wherein the aperture is configured to position the top strip such that, when the payload release device is at least partially disposed in a housing having at least one groove, at least a portion of the top strip is received in the at least one groove.

13. The payload release device of claim 11, further comprising:

a tether attached to the top portion of the member.

14. The payload release device of claim 11, further comprising:

a tag having a top strip, wherein the top strip of the tag is at least partially disposed in the aperture of the middle portion.

15. The payload release device of claim 14, wherein the tag further comprises a bottom portion, wherein the bottom portion of the tag is affixed to a payload.

16. The payload release device of claim 11, wherein the button is spring-loaded.

* * * * *